US012703170B2

(12) United States Patent
Telega

(10) Patent No.: US 12,703,170 B2
(45) Date of Patent: Aug. 11, 2026

(54) LAMINATED GLAZING

(71) Applicant: Pilkington Group Limited, Nr. Ormskirk (GB)

(72) Inventor: Tomasz Telega, Sandomierz (PL)

(73) Assignee: Pilkington Group Limited, Nr. Ormskirk (GB)

( * ) Notice: Subject to any disclaimer, the term of this patent is extended or adjusted under 35 U.S.C. 154(b) by 0 days.

(21) Appl. No.: 17/910,633

(22) PCT Filed: Mar. 12, 2021

(86) PCT No.: PCT/EP2021/056400
§ 371 (c)(1),
(2) Date: Sep. 9, 2022

(87) PCT Pub. No.: WO2021/180956
PCT Pub. Date: Sep. 16, 2021

(65) Prior Publication Data

US 2023/0166480 A1 Jun. 1, 2023

(30) Foreign Application Priority Data

Mar. 12, 2020 (GB) .................................... 2003627

(51) Int. Cl.
*B32B 3/24* (2006.01)
*B32B 3/26* (2006.01)
(Continued)

(52) U.S. Cl.
CPC ................ *B32B 7/02* (2013.01); *B32B 3/266* (2013.01); *B60J 1/001* (2013.01); *B60J 1/02* (2013.01);
(Continued)

(58) Field of Classification Search
CPC .................................................... B32B 3/266
(Continued)

(56) References Cited

U.S. PATENT DOCUMENTS 3,801,423 A 4/1974 Van et al.
5,391,411 A 2/1995 Rowland et al.
(Continued)

FOREIGN PATENT DOCUMENTS

CN 1798706 A 7/2006
CN 103042901 A 4/2013
(Continued)

OTHER PUBLICATIONS

English language translation of WO 2018-151235 Kagaya et al. Obtained from EPO. (Year: 2018).*
(Continued)

*Primary Examiner* — William P Watkins, III
(74) *Attorney, Agent, or Firm* — BUCHANAN INGERSOLL & ROONEY PC

(57) ABSTRACT

A laminated glazing for a vehicle windscreen comprising a first sheet of glazing material joined to a second sheet of glazing material by at least one sheet of adhesive interlayer material is described. Each of the first and second sheets of glazing material has a respective first major surface and second major surface, wherein the second major surface of the first sheet of glazing material faces the first major surface of the second sheet of glazing material. The second sheet of glazing material comprises at least a first hole therein, the first hole being adjacent a peripheral edge of the laminated glazing.

18 Claims, 2 Drawing Sheets

(51) Int. Cl.

| | |
|---|---|
| ***B32B 7/02*** | (2019.01) |
| ***B60J 1/00*** | (2006.01) |
| ***B60J 1/02*** | (2006.01) |
| *B32B 17/10* | (2006.01) |
| *B32B 27/30* | (2006.01) |
| *B32B 27/40* | (2006.01) |

(52) U.S. Cl.

CPC ..... *B32B 17/10036* (2013.01); *B32B 17/1077* (2013.01); *B32B 17/10788* (2013.01); *B32B 27/30* (2013.01); *B32B 27/304* (2013.01); *B32B 27/306* (2013.01); *B32B 27/40* (2013.01); *B32B 2250/40* (2013.01); *B32B 2307/732* (2013.01); *B32B 2605/00* (2013.01)

(58) Field of Classification Search

USPC .......................................................... 428/138

See application file for complete search history.

(56) References Cited

U.S. PATENT DOCUMENTS

| | | | | |
|---|---|---|---|---|
| 5,804,719 | A | 9/1998 | Didelot et al. | |
| 2006/0138798 | A1 | 6/2006 | Oehrlein | |
| 2013/0091779 | A1 | 4/2013 | Dominique et al. | |
| 2015/0224855 | A1* | 8/2015 | Legrand | B60J 1/00 52/204.62 |
| 2018/0178482 | A1 | 6/2018 | Uebelacker et al. | |
| 2019/0322161 | A1 | 10/2019 | Uebelacker | |
| 2021/0114354 | A1 | 4/2021 | Winstanley et al. | |
| 2021/0163345 | A1 | 6/2021 | Bronstein et al. | |
| 2022/0339751 | A1* | 10/2022 | Bankaitis | B24B 9/10 |

FOREIGN PATENT DOCUMENTS

| | | | | |
|---|---|---|---|---|
| EP | 0555991 | A2 | 8/1993 | |
| EP | 0825076 | A1 | 2/1998 | |
| GB | 1359166 | A | 7/1974 | |
| WO | WO-2018151235 | A1 * | 8/2018 | E06B 7/28 |
| WO | 2019186115 | A1 | 10/2019 | |
| WO | 2019245819 | A1 | 12/2019 | |
| WO | 2020/032059 | A2 | 2/2020 | |

OTHER PUBLICATIONS

International Search Report (PCT/ISA/210) Written Opinion (PCT/ISA/237) mailed on Jun. 15, 2021, by the European Patent Office as the International Searching Authority for International Application No. PCT/EP2021/056400. (10 pages).

Search Report under Section 17, dated Aug. 27, 2020 by the Intellectual Property Office in corresponding Great Britain Patent Application No. 2003627.3. (1 page).

Notification of the First Office Action issued on Feb. 2, 2025, by the China National Intellectu Property Administration in corresponding Chinese Patent Application No. 202180028932.5 and an English translation of the Notification. (15 pages).

Notification of the Second Office Action issued on Nov. 7, 2025, by the China National Intellectual Property Administration in corresponding Chinese Patent Application No. 202180028932.5 and an English translation of the Notification. (12 pages).

Notice of Reasons for Refusal issued on Jul. 30, 2025, by the Japanese Patent Office in corresponding Japanese Patent Application No. 2022-554617 and an English translation of the Notice. (9 pages).

* cited by examiner

LAMINATED GLAZING

The present invention relates to a laminated glazing for use in an automobile, in particular for use as a windscreen in an automobile.

Conventional laminated glazings for automotive windscreens comprise two plies of soda-lime-silicate glass joined by a sheet of polyvinyl butyral (PVB). Typically, each glass sheet is 2.1 mm thick and the PVB sheet is typically 0.76 mm thick.

As is known in the art, a laminated automotive windscreen provides the driver of the vehicle with improved safety benefits. However, vehicle manufacturers are also addressing vehicle safety in the event of a forward collision with a pedestrian.

In the event of a collision with a pedestrian, the pedestrian may impact the vehicle windscreen thereby causing further injury to the pedestrian.

US2019/322161A1 describes a laminated side window for a vehicle including at least a first pane and a second pane that are joined to one another via a thermoplastic intermediate layer, wherein the first pane, the second pane, and the thermoplastic intermediate layer each has a hole and wherein the holes of the first pane, of the second pane, and of the thermoplastic intermediate layer are superposed such that a leadthrough for the fastening of a clamping element extends through the entire side window.

US2018/178482A1 describes a composite glass pane with a through mounting hole. The composite glass pane having a first pane and a second pane that are bonded to one another via a thermoplastic intermediate layer and at least one passage that extends through the entire composite glass pane, wherein the edge of the passage is provided with a polymeric element formed in one piece having a through hole running through the passage.

EP0555991A2 describes a glass laminate assembly comprises two glass sheets with an interlayer of cured resin formed by a cast-in-place process. An aperture for an attachment device is formed in at least one of the glass sheets and a resilient adhesive seal is formed between the faces of the glass sheets and surrounding the hole.

EP0825076A2 describes a windscreen including an external glass sheet and an internal glass sheet separated by a layer of polyvinyl butyral. The internal glass sheet and the intermediary layer present through holes which receive an ultrasound transducer resting on the interior surface of the external glass sheet.

The present invention aims to provide a vehicle windscreen that is arranged to lower the risks of serious pedestrian injuries in case the vehicle collides with a pedestrian.

Accordingly, from a first aspect the present invention provides a laminated glazing for a vehicle windscreen comprising a first sheet of glazing material joined to a second sheet of glazing material by at least one sheet of adhesive interlayer material, each of the first and second sheets of glazing material having a respective first major surface and second major surface, wherein the second major surface of the first sheet of glazing material faces the first major surface of the second sheet of glazing material, further wherein the second sheet of glazing material comprises at least a first hole therein, the first hole in the second sheet of glazing material being adjacent a peripheral edge of the laminated glazing.

Preferably the laminated glazing is a vehicle windscreen.

Preferably the first hole in the second sheet of glazing material is not aligned with a hole in the first sheet of glazing material.

Preferably the first sheet of glazing material does not have any holes therein.

Preferably the peripheral edge is a lower peripheral edge when the laminated glazing is installed as a windscreen in a vehicle.

Preferably the first hole in the second sheet of glazing material extends between the second major surface of the second sheet of glazing material to the first major surface of the second sheet of glazing material.

Preferably the first hole in the second sheet of glazing material has a depth of between 5% and 100% of the thickness of the second sheet of glazing material, more preferably between A % and B % of the thickness of the second sheet of glazing material, wherein A is 10 or 15 or 20 or 25 or 30 and B is 95, or 90, or 80, 05 75, or 70, or 65, or 60, or 55, or 50, or 49.

In some embodiments the first hole in the second sheet of glazing material extends between the first and second major surfaces of the second sheet of glazing material such that the first hole is a first through hole, and wherein the first through hole has a first opening in the first major surface of the second sheet of glazing material and a second opening in the second major surface of the second sheet of glazing material, the first opening being opposite a portion of the at least one sheet of adhesive interlayer material.

In such embodiments it is preferred that the second major surface of the first sheet of glazing material is not directly accessible via the first through hole. Preferably the at least one sheet of adhesive interlayer material covers the first opening in the first through hole, more preferably the at least one sheet of adhesive interlayer material covers the entire first opening in the first through hole.

In some embodiments first hole in the second sheet of glazing material is one of a plurality of holes in the second sheet of glazing material and the area of the first hole in the second major surface of the second sheet of glazing material is between 0.01 $cm^2$ and 200 $cm^2$, preferably between 0.01 $cm^2$ and 100 $cm^2$, more preferably between 0.01 $cm^2$ and 10 $cm^2$, even more preferably between 0.01 $cm^2$ and 5 $cm^2$, even more preferably between 0.01 $cm^2$ and 0.5 $cm^2$.

Preferably one or more of the other holes in the plurality of holes in the second sheet of glazing material has an area between 0.01 $cm^2$ and 200 $cm^2$, preferably between 0.01 $cm^2$ and 100 $cm^2$, more preferably between 0.01 $cm^2$ and 10 $cm^2$, even more preferably between 0.01 $cm^2$ and 5 $cm^2$, even more preferably between 0.01 $cm^2$ and 0.5 $cm^2$.

In some embodiments the first hole in the second sheet of glazing material is one of a plurality of holes in the second major surface of the second sheet of glazing material, and wherein two or more of the holes have the same area.

Preferably all of the holes in the plurality of holes in the second sheet of glazing material have the same area.

In some embodiments the first hole in the second sheet of glazing material is spaced apart from a hole by a first spacing, wherein the first spacing is between 0.5 cm and 50 cm, more preferably between 0.5 cm and 40 cm, more preferably between 0.5 cm and 30 cm, more preferably between 0.5 cm and 20 cm, more preferably between 0.5 cm and 10 cm.

In some embodiments the first hole in the second sheet of glazing material is spaced apart from a peripheral edge of the laminated glazing.

Preferably the first hole in the second sheet of glazing material is spaced apart from the peripheral edge of the laminated glazing by between 1 cm and 20 cm, more preferably between 1 cm and 15 cm, more preferably between 1 cm and 10 cm, more preferably between 1 cm and 9 cm or 8 cm or 7 cm or 6 cm or 5 cm.

In some embodiments the first hole in the second sheet of glazing material is spaced apart from a peripheral edge of the laminated glazing configured to be a lower edge of the laminated glazing when installed in a vehicle.

Preferably the first hole in the second sheet of glazing material is one of a plurality of holes in the second sheet of glazing material spaced apart from the peripheral edge of the laminated glazing configured to be the lower edge of the laminated glazing when installed in a vehicle.

Preferably the holes in the plurality of holes in the second sheet of glazing material spaced apart from the peripheral edge of the laminated glazing configured to be the lower edge of the laminated glazing when installed in a vehicle are arranged in a line, and preferably the line is parallel to the peripheral edge of the laminated glazing configured to be the lower edge of the laminated glazing when installed in a vehicle.

When the first hole in the second sheet of glazing material is one hole of a plurality of holes in the second sheet of glazing material, it is preferred that each hole has an area that is the same to within ±20%.

When the first hole in the second sheet of glazing material is one region of a plurality of holes in the second sheet of glazing material, it is preferred that each hole has the same area.

In some embodiments the first sheet of glazing material has a thickness between 1 mm and 5 mm, preferably between 1.3 mm and 3 mm In some embodiments the second sheet of glazing material has a thickness between 1 mm and 5 mm, preferably between 1.3 mm and 3 mm.

In some embodiments the second sheet of glazing material is thinner than the first sheet of glazing material.

In some embodiments the first major surface of the first sheet of glazing material is a convex surface and the second major surface of the second sheet of glazing material is a convex surface.

The laminated glazing has other preferable features.

Preferably the laminated glazing is curved in at least one direction. Preferably the radius of curvature in the at least one direction is between 500 mm and 20000 mm, more preferably between 1000 mm and 8000 mm.

Preferably the at least one sheet of adhesive interlayer material comprises polyvinyl butyral (PVB), acoustic modified PVB, a copolymer of ethylene such as ethylene vinyl acetate (EVA), polyurethane (PU), poly vinyl chloride (PVC), a copolymer of ethylene and methacrylic acid (EMA) or Uvekol (a liquid curable resin).

Preferably the at least one sheet of adhesive interlayer material is a sheet of polyvinyl butyral (PVB), EVA, PVC, EMA, polyurethane, acoustic modified PVB or Uvekol (a liquid curable resin).

Preferably the at least one sheet of adhesive interlayer material has no holes therein that are aligned with the first hole in the second sheet of glazing material, more preferably the at least one sheet of adhesive interlayer material has no holes therein.

Preferably the at least one sheet of adhesive interlayer material has a thickness between 0.3 mm and 2.3 mm, more preferably between 0.3 mm and 1.6 mm, most preferably between 0.3 and 0.8 mm.

Preferably the first and/or second sheet of glazing material has a thickness between 1 mm and 3 mm.

Preferably the first and/or second sheet of glazing material has a thickness between 1.4 mm and 2.8 mm, more preferably between 1.6 mm and 2.3 mm.

Preferably the first and/or second sheet of glazing material is a sheet of soda-lime-silicate glass. Soda-lime-silicate glass is often referred to as soda-lime-silica glass, or simply a sheet "soda-lime" glass.

Preferably the first and/or second sheet of glazing material is a sheet of soda-lime-silicate glass, in particular a sheet of float glass.

Preferably the second sheet of glazing material is a sheet of alkali aluminosilicate glass.

Preferably the second sheet of glazing material comprises at least about 6 wt % (percent by weight) aluminium oxide ($Al_2O_3$).

Preferably the second sheet of glazing material is chemically strengthened i.e. chemically strengthened glass. When the second sheet of glazing material is chemically strengthened, preferably the second sheet of glazing material has a thickness less than 1.2 mm, more preferably between 0.3 mm and 1 mm, even more preferably between 0.4 mm and 0.9 mm.

The present invention will now be described with reference to the following figures in which:

FIG. 1 shows a cross section of a curved laminated glazing in accordance with the present invention.

Figure 1:
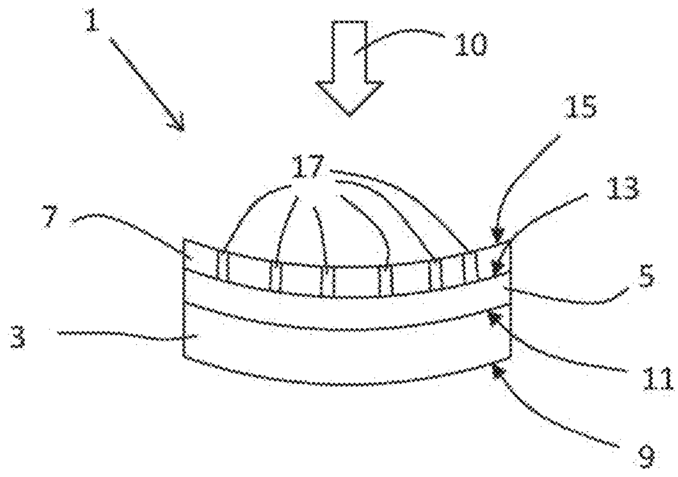
FIG. 1 is a cross section view of a laminated glazing according to the present invention.

The laminated glazing 1 has a first sheet 3 of soda-lime-silicate glass having a composition such as clear float glass, typically with the addition of iron oxide as a tinting agent to provide the laminated glazing with some form of solar control. The first sheet 3 has a thickness of 2.3 mm although the thickness may be in the range 1.4 mm to 2.5 mm or in the range 1.6 mm to 2.3 mm.

A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2%; $Fe_2O_3$ 0.005-2%. The glass composition may also contain other additives, for example, refining aids, which would normally be present in an amount of up to 2%. The soda-lime-silica glass composition may contain other colouring agents such as $Co_3O_4$, NiO and Se to impart to the glass a desired colour when viewed in transmitted light. The transmitted glass colour may be measured in terms of a recognised standard such as BS EN410.

The laminated glazing 1 also has a second sheet 7 of soda-lime-silicate glass having a thickness of 1.6 mm, but the second sheet may have a thickness may be in the range 1.4 mm to 2.5 mm and is preferably not as thick as the first sheet 3.

The first sheet 3 is joined to the second sheet 7 by an adhesive interlayer 5. The adhesive interlayer 5 is a 0.76 mm thick sheet of PVB. The adhesive interlayer 5 may have a thickness between 0.3 mm and 1.8 mm.

Other suitable adhesive interlayers include PVC, EVA, EMA and polyurethane.

The laminated glazing 1 is curved in one or more directions. The radius of curvature in one of the one or more directions is between 1000 mm and 8000 mm.

When the laminated glazing is curved in two directions, suitably each direction of curvature is orthogonal to the other. Suitably the radius of curvature in one or both directions of curvature is between 1000 mm and 8000 mm.

The first sheet 3 has a convex first surface 9 and an opposing concave second surface 11. The second sheet 7 has a convex first surface 13 and an opposing concave second surface 15. The concave surface 11 of the first sheet 3 is in contact with the adhesive interlayer 5 and the convex surface 13 of the second sheet 7 is in contact with the adhesive interlayer 5. Using conventional nomenclature, the convex surface 9 of the first sheet 3 is "surface one" (or S1) of the laminated glazing 1, the concave surface 11 of first sheet 3 is "surface two" (or S2) of the laminated glazing 1, the convex surface 13 of second sheet 7 is "surface three" (or S3) of the laminated glazing 1 and the concave surface 15 of second sheet 7 is "surface four" (or S4) of the laminated glazing 1.

In the second sheet 7 is an array of holes 17. As seen from FIG. 1, in this example the holes in the array of holes 17 each extend through the thickness of the second sheet 7 and each hole respectively has an opening in the first surface 13 and an opening in the second surface 15. The sheet of PVB 5 has no holes opposite the openings of the holes in the first surface 13 such that the sheet of PVB 5 covers the openings of the holes in the first surface 13.

In this example both the first sheet 3 and the sheet of PVB 5 have no holes therein such that no holes in the first sheet 3 or the sheet of PVB 5 are aligned with a respective hole in the array of holes 17.

Figure 2:
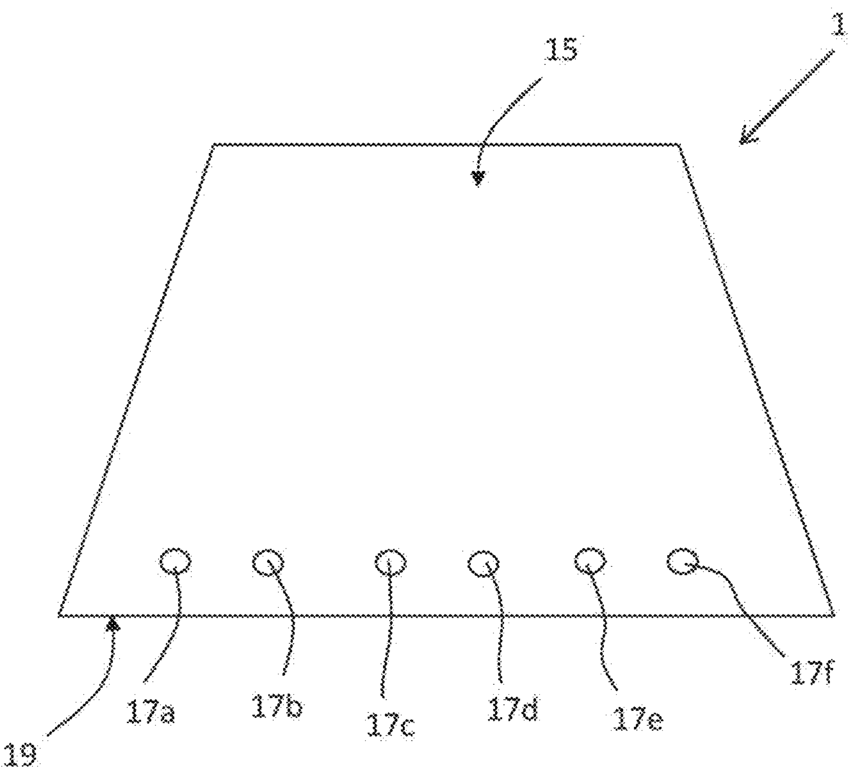
FIG. 2 is a plan view of laminated glazings in accordance with the present invention.

FIG. 2 is a plan view of the laminated glazing 1 in the direction of arrow 10 of FIG. 1.

In FIG. 2, the periphery of the laminated glazing is typical of a vehicle windscreen. The laminated glazing has a lower peripheral edge 19 and inboard of the lower peripheral edge 19 are six holes 17*a*, 17*b*, 17*c*, 17*c*, 17*e*, 17*f* forming the array of holes 17.

Each hole 17*a*, 17*b*, 17*c*, 17*c*, 17*e*, 17*f* is circular with a diameter of about 0.5 cm.

The holes 17*a*, 17*b*, 17*c*, 17*c*, 17*e*, 17*f* are equally spaced such that the space between holes 17*a* and 17*b* is the same as the space between holes 17*b* and 17*c*, and so on.

The holes 17*a*, 17*b*, 17*c*, 17*c*, 17*e*, 17*f* lie in a line that is parallel to the lower peripheral edge 19.

The holes may be in a region of the laminated glazing where there is an obscuration band on the concave surface 15 of the second sheet 7.

By providing the holes 17*a*, 17*b*, 17*c*, 17*c*, 17*e*, 17*f*, in the event of an impact on the convex first surface 9 of the first sheet 3, the second sheet 7 can break more easily so that the rigidity of the laminated glazing 1 is reduced. When the laminated glazing 1 is installed as a windscreen in a vehicle, in the event of a pedestrian being involved in a collision with the vehicle, the reduction in rigidity of the windscreen upon an impact with the convex first surface 9 reduces the seriousness of injury to the pedestrian.

Although the lower peripheral edge 19 is straight in this example, the lower peripheral edge may be curved, and the array of holes may be arranged in a straight line or may be arranged to follow the curvature of the curved lower peripheral edge.

Figure 3:
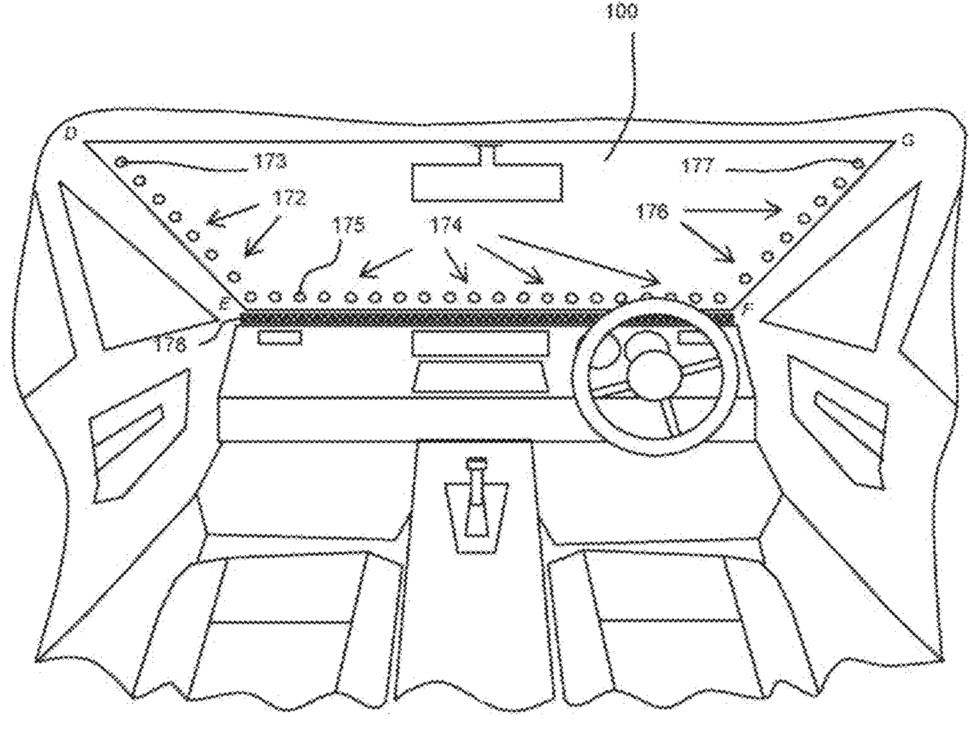
FIG. 3 is the view from inside a vehicle that has a windscreen in accordance with the present invention.

Another embodiment of the present invention is shown in FIG. 3.

FIG. 3 shows the view from inside a vehicle that has a windscreen 100 in accordance with the present invention.

The windscreen 100 is essentially the same as the laminated glazing 1 previously described. The vehicle windscreen has a lower peripheral edge extending between the points E and F. The vehicle windscreen has an upper peripheral edge extending between the points D and G.

In the surface four (the inner facing surface) of the windscreen 100 are a plurality of holes. There is a first array of holes 174 that has twenty circular (only one of which is labelled 175). Each hole 175 has dimensions of between 1 cm×1 cm and 3×3 cm. It is preferred all the holes 175 have the same size and/or area. The holes 175 are arranged in a line running parallel to the lower peripheral edge E-F i.e. the diameters of the holes 175 are aligned and parallel to the lower peripheral edge E-F.

In this embodiment also in surface four of the windscreen 100 is a second array of holes 172 running along the left hand peripheral edge D-E of the windscreen 100 and a third array of holes 176 running along the right hand peripheral edge F-G. The second array of holes 172 has seven circular (only one of which is labelled 173) arranged in a line parallel to the left hand peripheral edge D-E. The third array of holes 176 also has seven circular holes (only one of which is labelled 177) arranged in a line parallel to the right-hand peripheral edge F-G.

Each of the holes in the second and third arrays are the same size and/or have the same area.

Instead of circular holes, another configuration hole may be used, for example substantially square-like.

With reference to FIG. 2, the holes 17*a*, 17*b*, 17*c*, 17*c*, 17*e*, 17*f* are made using a conventional diamond tipped drill prior to the assembly of the laminated glazing. Holes are drilled prior to any toughening of the glass sheet that may cause the glass sheet to break when drilled with a conventional diamond tipped drill or the like. In this example each hole 17*a*, 17*b*, 17*c*, 17*c*, 17*e*, 17*f* is drilled to the same depth, which may be between 5% and 100% of the thickness of the second sheet 7. The holes may have different depths.

In embodiments where a hole is drilled through the entire thickness of the second sheet of glazing material, the hole is referred to as a through hole and the sheet of PVB 5 prevents direct contact with the second surface 11 through the through hole because the sheet of PVB 5 has no holes therein, in particular the sheet of PVB 5 has no holes therein that align at least partially with the through hole.

It has been found that by having holes in the inner facing surface of the laminated windscreen, and preferably holes that extend through the entire thickness of the inner facing glass sheet, it is easier to break the inner glass sheet in the event of a pedestrian colliding with the outer facing surface of the laminated windscreen. The holes are positioned not to be visually distracting to the vehicle driver and do not reduce the performance of the windscreen in stone impact tests.

The invention claimed is:

1. A laminated glazing for a vehicle windscreen comprising a first sheet of glazing material joined to a second sheet of glazing material by at least one sheet of adhesive interlayer material, each of the first and second sheets of glazing material having a respective first major surface and second major surface, wherein the second major surface of the first sheet of glazing material faces the first major surface of the second sheet of glazing material, further wherein the second sheet of glazing material comprises a first array of holes including at least a first hole therein, the first hole in the second sheet of glazing material being adjacent or spaced apart from a peripheral edge of the laminated glazing, further wherein the first major surface of the first sheet of glazing material is a convex surface and the second major surface of the second sheet of glazing material is a concave surface; and wherein the first sheet of glazing material does not have any holes therein, wherein the peripheral edge is a lower peripheral edge when the laminated glazing is installed as a windscreen in a vehicle, and wherein the first array of holes is only a single line of holes.

2. A laminated glazing according to claim 1, wherein the first hole in the second sheet of glazing material extends between the second major surface of the second sheet of glazing material to the first major surface of the second sheet of glazing material.

3. A laminated glazing according to claim 1, wherein the first hole in the second sheet of glazing material has depth of between 5% and 100% of the thickness of the second sheet of glazing material.

4. A laminated glazing according to claim 1, wherein the first hole in the second sheet of glazing material is one of a plurality of holes in the second sheet of glazing material and the first hole in the second major surface of the second sheet of glazing material has an area between 0.01 $cm^2$ and 200 $cm^2$.

5. A laminated glazing according to claim 4, wherein one or more of the other holes in the plurality of holes in the second sheet of glazing material has an area between 0.01 $cm^2$ and 200 $cm^2$.

6. A laminated glazing according to claim 1, wherein the first hole in the second sheet of glazing material is spaced apart from another hole by a first spacing, wherein the first spacing is between 0.5 cm and 50 cm.

7. A laminated glazing according to claim 1, wherein the first hole in the second sheet of glazing material is spaced apart from the peripheral edge of the laminated glazing by between 1 cm and 20 cm.

8. A laminated glazing according to claim 1, wherein the second sheet of glazing material is thinner than the first sheet of glazing material.

9. A laminated glazing according to claim 1, wherein the laminated glazing has a thickness between 3 mm and 10 mm.

10. A laminated glazing according to claim 1, wherein first hole in the second sheet of glazing material extends between the first and second major surfaces of the second sheet of glazing material such that the first hole is a first through hole, and wherein the first through hole has a first opening in the first major surface of the second sheet of glazing material and a second opening in the second major surface of the second sheet of glazing material, the first opening being opposite a portion of the at least one sheet of adhesive interlayer material.

11. A laminated glazing according to claim 10, wherein the second major surface of the first sheet of glazing material is not directly accessible via the first through hole.

12. A laminated glazing according to claim 1, wherein the first hole in the second sheet of glazing material is not aligned with a hole in the at least one sheet of adhesive interlayer material.

13. A laminated glazing according to claim 1, wherein the at least one sheet of adhesive interlayer material does not have any holes therein.

14. A laminated glazing according to claim 10, wherein the at least one sheet of adhesive interlayer material covers at least a part of the first opening in the first through hole.

15. A laminated glazing for a vehicle windscreen comprising a first sheet of glazing material joined to a second sheet of glazing material by at least one sheet of adhesive interlayer material, each of the first and second sheets of glazing material having a respective first major surface and second major surface, wherein the second major surface of the first sheet of glazing material faces the first major surface of the second sheet of glazing material, further wherein the second sheet of glazing material comprises a first array of holes therein, the first array of holes in the second sheet of glazing material being arranged in a line and being adjacent or spaced apart from a peripheral edge of the laminated glazing, further wherein the first major surface of the first sheet of glazing material is a convex surface and the second major surface of the second sheet of glazing material is a concave surface; wherein the first sheet of glazing material does not have any holes therein; and wherein the peripheral edge is a lower peripheral edge when the laminated glazing is installed as a windscreen in a vehicle, and wherein the first array of holes is only a single line of holes.

16. A laminated glazing according to claim 15, wherein the first array of holes lies in a line parallel to the lower peripheral edge.

17. A laminated glazing according to claim 15, further comprising a second array of holes in the second sheet of glazing material, the second array of holes being arranged in a line and being adjacent or spaced apart from a different peripheral edge of the laminated glazing, wherein the different peripheral edge is a left-hand or right-hand peripheral edge when the laminated glazing is installed as a windscreen in a vehicle.

18. A laminated glazing for a vehicle windscreen comprising a first sheet of glazing material joined to a second sheet of glazing material by at least one sheet of adhesive interlayer material, each of the first and second sheets of glazing material having a respective first major surface and second major surface, wherein the second major surface of the first sheet of glazing material faces the first major surface of the second sheet of glazing material, further wherein the second sheet of glazing material comprises a first array of holes including at least a first hole therein, the first hole in the second sheet of glazing material being adjacent or spaced apart from a peripheral edge of the laminated glazing, further wherein the first major surface of the first sheet of glazing material is a convex surface and the second major surface of the second sheet of glazing material is a concave surface; wherein the first sheet of glazing material does not have any holes therein; wherein the peripheral edge is a lower peripheral edge when the laminated glazing is installed as a windscreen in a vehicle; and wherein there are no holes in the laminated glazing adjacent an upper peripheral edge, wherein the upper peripheral edge is opposite the lower peripheral edge when the laminated glazing is installed as a windscreen in a vehicle, and wherein the first array of holes is only a single line of holes.

* * * * *